United States Patent [19]

Olson et al.

[11] 4,366,440

[45] Dec. 28, 1982

[54] ADJUSTABLE CONTRAST COMPRESSOR

[75] Inventors: Charles L. Olson, Oaklyn; Lucas J. Bazin, Vincentown, both of N.J.

[73] Assignee: RCA Corporation, New York, N.Y.

[21] Appl. No.: 202,486

[22] Filed: Oct. 31, 1980

[51] Int. Cl.$^3$ .......................... H04N 9/04; H03G 3/30
[52] U.S. Cl. .......................................... 330/11; 330/86; 330/282; 358/32; 358/164; 358/169
[58] Field of Search .................. 330/11, 86, 110, 282; 358/32, 164, 169

[56] References Cited

U.S. PATENT DOCUMENTS

| | | | |
|---|---|---|---|
| 3,543,169 | 11/1970 | Hill | 330/11 X |
| 3,684,825 | 8/1972 | Dischert et al. | 358/169 X |
| 3,714,602 | 1/1973 | Macey | 330/86 |
| 4,126,884 | 11/1978 | Shanley | 358/169 X |

OTHER PUBLICATIONS

Graeme, *Applications of Operational Amplifiers-Third-Generation Techniques*, McGraw-Hill, 1973, pp. 36-37, 96-97, 147, 217-218.

Graeme, et al., *Operational Amplifiers-Design and Applications*, McGraw-Hill, 1971, pp. 251-254.

Jung, I. C., *Op-Amp Cookbook*, Howard W. Sams, 1977, pp. 213, 399.

Primary Examiner—James B. Mullins
Attorney, Agent, or Firm—Eugene M. Whitacre; Paul J. Rasmussen; William H. Meise

[57] ABSTRACT

A feedback amplifier is configured as a contrast compressor for video signals including a reference blanking level. A feedback resistance is divided into two resistors coupled at a juncture. Contrast compression is accomplished by a diode coupled to the juncture and to a voltage source which may be adjusted to vary the point of onset of compression. The diode current perturbs the operating point of the amplifier, thereby producing a condition in which the blanking level at the output is other than zero volts. This is undesirable as it may affect following circuits adversely or require further setup. A clamp is coupled to the inverting input terminal for offsetting the perturbation of the amplifier operating point caused by the diode current.

7 Claims, 4 Drawing Figures

ADJUSTABLE CONTRAST COMPRESSOR

This invention relates to contrast compression circuits useful in television processing amplifiers.

In television cameras, it may be desirable to amplify a video signal generated by a vidicon while maintaining a particular portion of the signal at a reference value. This may be desirable, for example, where the amplifier precedes a gamma correction circuit. The gamma correction circuit has a nonlinear transfer function, and it is important to maintain a reference portion of the video signal such as blanking level or black level at a particular value such as zero volts at the input of the gamma correction circuit. The blanking level may be maintained at zero volts by a clamping circuit, or alternatively by use of a direct-current amplifier for amplification of an input signal in which the blanking level is at zero volts.

It is also desirable to provide a television camera with capability for contrast compression. Contrast compression may be desirable for particular lighting conditions, as where the camera views a ballfield which is partially shaded and partially in sunlight. Ordinarily, the dynamic range of the television system will be exceeded by the extremes of the scene lighting. Since black level is clamped, the reproduction of the dark areas remains substantially unimpaired. However, the bright areas include areas in which the scene brightness exceeds the dynamic range of the television system. By the use of a contrast compressor, the range of brightness is translated to a lesser dynamic range of video which is capable of reproduction by the television system. The contrast compressor has a high gain for signals in a particular portion of the brightness excursion and a lesser gain in other ranges. The contrast compressor is a form of video distortion which may not be always be desired; it may be desirable to turn off the contrast compression. Furthermore, it may be desirable to change the video level at which the contrast compression begins to take place.

SUMMARY OF THE INVENTION

A contrast compressor adapted for use with a source of video signals comprises an amplifier including an inverting input terminal and an input resistor coupling the inverting input terminal to a source of video signals. A first feedback resistor is coupled to the inverting input terminal. A second feedback resistor is coupled to the amplifier output terminal. The first and second feedback resistors are coupled together at a juncture. A current-controllable resistor is coupled to the juncture and to a point of potential for controlling the signal gain. The current-controlled resistor perturbs the operating point of the amplifier, causing deviation of a reference video level from the desired value and making contrast adjustment difficult. A clamp coupled to the inverting input terminal clamps the reference portions of the video signal to the desired value, eliminating the perturbation and improving the contrast adjustment.

DESCRIPTION OF THE INVENTION

Figure 1:
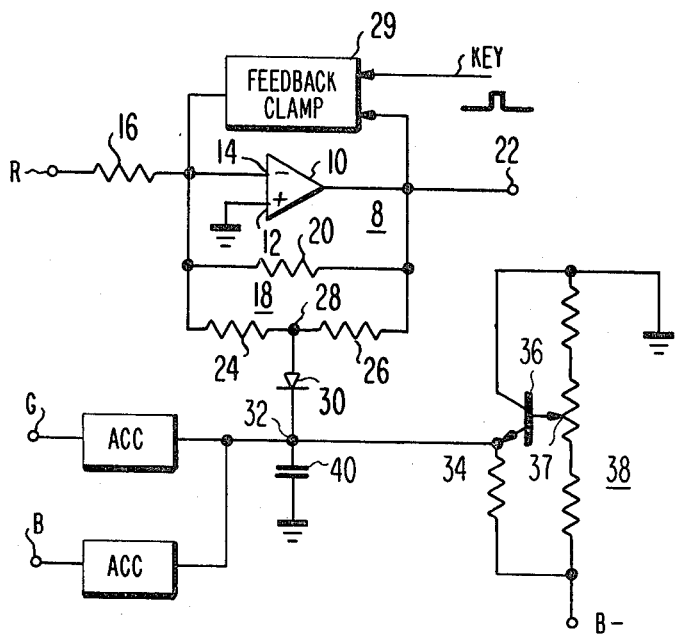
FIGS. 1, 3 and 4 are diagrams partially in block and partially in schematic form illustrating embodiments of contrast compressors in accordance with the invention.

FIG. 1 illustrates, in simplified form, an amplifier 8 for video signals providing contrast compression and supplying at its output a signal the reference level of which is maintained at a predetermined level. In FIG. 1, an amplifier 10 has a noninverting input terminal 12 coupled to a ground and an inverting input terminal 14. An input resistor 16 couples inverting input terminal 14 to a terminal R to which red-representative video signals are applied from a source, not shown. A feedback network 18 includes a feedback resistor 20 coupled to inverting input terminal 14 and to an output terminal 22 of amplifier 10. Network 18 also includes resistors 24 and 26 coupled to inverting input 14 and to output terminal 22, respectively, and coupled together at a juncture 28. A feedback clamp illustrated as a block 29 is coupled between inverting input terminal 14 and output terminal 22. A diode 30 has its anode coupled to juncture 28 and its cathode coupled to a juncture 32. Juncture 32 is maintained at a reference voltage by a direct-voltage source designated generally as 34. Source 34 includes a NPN transistor 36 having its emitter coupled to juncture 32, its collector coupled to a ground and its base coupled to a tap 37 on a voltage divider 38 coupled between a source of B— of negative energizing potential and ground. A capacitor 40 coupled between juncture 32 and ground provides a low alternating-current impedance at the anode of diode 30. A green-responsive amplifier/contrast compressor 42 and a blue-responsive amplifier/contrast compressor 44 similar to arrangement 8 are also coupled to juncture 32 for control by direct-voltage source 34.

In operation, a video signal applied to input terminal R may include blanking portions at zero volts, positive-going portions representative of black level and still greater positive-voltage portions representative of white signals. Those zero-volt portions representative of blanking level cause no current flow in input resisitor 16 and create no amplifier response.

Under zero-input voltage conditions representative of blanking level, the output voltage is normally zero and the negative bias applied to juncture 32 and to the cathode of diode 30 hold the diode in a conductive state. With diode 30 conductive, that portion of feedback network 18 including resistors 24 and 26 is ineffective to couple to inverting input terminal 14 a current representative of the output voltage, because the end of resistor 24 remote from inverting terminal 14 is coupled to a point of substantially constant voltage. With diode 30 conductive, the feedback is established by resistor 20 alone rather than by the combination of resistor 20 in parallel with the series combination of resistors 24 and 26. Consequently, the voltage gain Av of the circuit with diode 30 conductive is described by $$Av = \frac{R20}{R16}$$

where R16 and R20 represent the resistances of resistors 60 and 20, respectively.

Since resistor 20 is never disconnected, there is always negative feedback around amplifier 10. Consequently, inverting input terminal 14 is always a virtual ground. Resistors 24 and 26, then, act as a signal voltage divider as to the anode of diode 30, i.e., the voltage Vs at the anode of diode 30 due to the output signal level is $$V_s = \left(\frac{R24}{R24 + R26}\right) V_{out}$$

Figure 2:
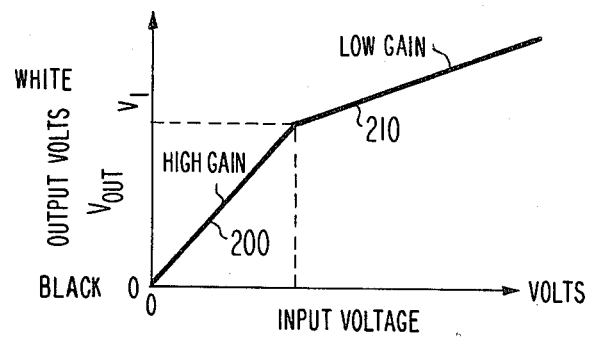
FIG. 2 is an input-output voltage plot of the arrangements of FIGS. 1 and 3 for a particular contrast control setting.

So long as the output voltage Vout due to the signal does not exceed a particular value V1

$$V1 = V32\left(\frac{R24 + R26}{R24}\right) + V_{offset}$$

where
V32 is the voltage at juncture 32, and
Voffset is the semi-conductor offset voltage of diode 32, diode 30 will remain conductive, and the gain will remain at a high level established by feedback resistor 20. The high-gain condition is illustrated in FIG. 2 by a line portion 200 in the region of input voltage between zero volts and V1.

When the input signal goes toward white level, the output signal also rises (in the negative direction) and at some value determined by the setting of the tap on voltage divider 38 the output voltage will exceed V1. At this time, diode 30 will become unbiased or back-biased and will cease conduction. When diode 30 is non-conductive, the series combination of resistors 24 and 26 is coupled in parallel with resistor 20, the feedback resistance decreases and the amount of feedback increases, thereby decreasing the incremental gain. Further increases in signal level towards white level maintain the low-gain condition, as shown by line portions 210 in FIG. 2.

As so far described, the arrangement is capable of adjusting the point of onset of compression. However, when diode 30 is conductive, the current flow in the diode perturbs the operation of amplifier. At low signal levels, resistor 24 is coupled at one end to a reference voltage which is the algebraic sum V32+Voffset In effect, this forms a classical summing circuit in which the signal voltage at terminal R and the fixed voltage at juncture 28 are summed through resistors 16 and 24, respectively, at inverting input terminal 14. This summing affects the resting level of the amplifier, as may be understood by assuming the input signal at terminal R to be zero volts. With terminal R at zero volts, the output voltage at terminal 22 will be essentially $$\frac{R20}{R24} (V28),$$

rather than the desired zero volts. As mentioned, this will perturb the operation of the following gamma-correction stages and makes setup difficult. Furthermore, the output rest voltage will change each time the tap on divider 38 is moved to change the break point in the gain. It should be noted that the voltage V28 at juncture 28 is equal to the voltage at tap 37 because the offset voltage of diode 30 equals and offsets the base-emitter voltage of transistor 36.

Figure 3:
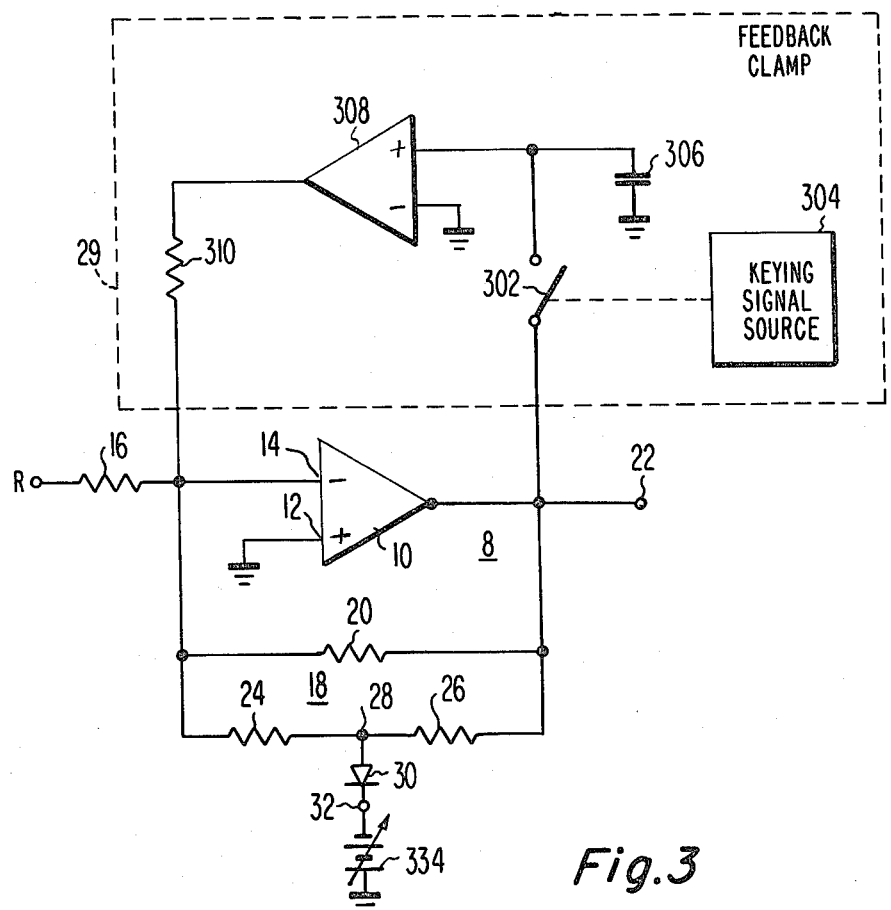

In accordance with the invention, the offset of the rest output voltage of the amplifier/contrast compressor is corrected by a clamp, illustrated in FIG. 1 as a keyed feedback clamp 29. Keyed clamp 29 is shown in greater detail in FIG. 3. The correspondence of components of FIGS. 1 and 3 is apparent. In FIG. 3, feedback clamp 29 includes a keying switch 302 shown as being controlled from a conventional source 304 of keying signals.

Keyed switch 302 couples output terminal 22 to a capacitor 306 during the video blanking interval for establishing on capacitor 306 a voltage representative of the output voltage during the blanking interval. The input terminals of an amplifier 308 are coupled across capacitor 306. The output terminal of amplifier 306 is coupled by way of a resistor 310 to inverting input terminal 14. The capacitor voltage is replicated at the output terminal of amplifier 308, and the replicated voltage is summed by resistor 310 at inverting input terminal 14 with voltages coupled thereto by resistors 16 and 24. The arrangement is a degenerative or negative-feedback loop which compares the capacitor voltage with the voltage on the inverting input terminal of amplifier 308 (ground or zero volts, in this case) and produces a summing voltage across resistor 310 tending to minimize the difference. Thus, the loop slews to reduce the voltage across capacitor 306 towards zero volts. Since the capacitor voltage is the sampled black level, the loop slews to force the blanking level towards zero volts. A change in the contrast threshold level by a readjustment in the voltage of battery 334 changes the point of onset of contrast compression but also changes the black level at output terminal 22. The feedback clamp then slews to produce an offsetting voltage which corrects the black level. With the black level reset to zero volts, the remainder of the signal (the black level, gray and white levels) follows along. Thus, contrast compressor threshold can be set independent of black level settings. An additional advantage of the described arrangement is that the lack of variations in output level with changes in contrast compression threshold avoids the effects of changes in output level on the threshold itself, providing a more positive "feel" to the threshold control. The contrast compression can even be turned off by disconnecting the diode without perturbing the system levels.

Figure 4:
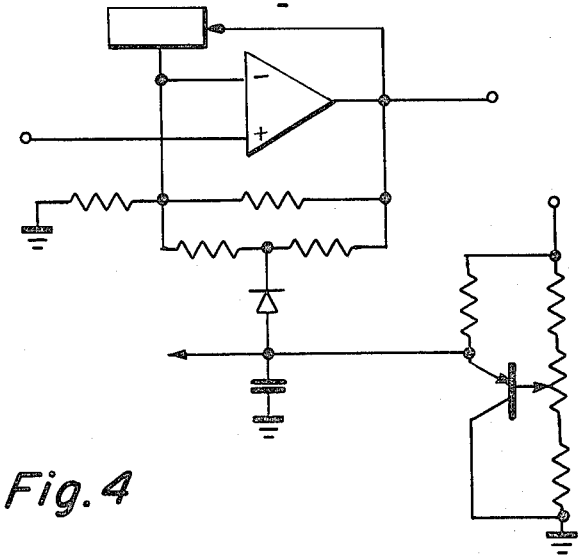

FIG. 4 illustrates another embodiment of the invention. The arrangement of FIG. 4 is similar to that of FIG. 1, but differs in that the input signal is applied to the non-inverting input terminal, so the contrast compressor signal throughput is non-inverting rather than inverting as in the arrangements of FIGS. 1 and 3. The polarity of the diode is reversed to correspond to the reversed signal direction, and the bias power supply produces a positive voltage rather than a negative voltage.

Other embodiments of the invention will be apparent to those skilled in the art. For example, a resistance can be coupled in series with diode 30 to create a more gentle transition between high and low gain conditions. The amplifier of the contrast compressor may be driven by the push-pull outputs of a multiplier circuit rather than being driven from single-ended sources as described.

What is claimed is:
1. A contrast compressor adapted for use with a source of video signals, comprising:
an amplifier including an inverting input terminal;

input resistance means coupled to said inverting terminal and to the source of video signals;

first and second resistance means coupled to an output terminal of said amplifier and to said inverting input terminal respectively for providing negative feedback for reducing the signal gain, said first and second resistance means being serially coupled and having a juncture therebetween;

current-controllable resistance means coupled to said juncture and to a point of reference potential for controlling the magnitude of said feedback for controlling said signal gain in response to the difference between the voltage at said output terminal of said amplifier and the voltage of said point of reference potential, said current-controllable resistance means being conductive during those intervals during which said video signals take on a reference level thereby perturbing the operating point of said amplifier and deviating a reference level of said video signals from the desired value; and voltage clamping means coupled to said inverting input terminal for clamping at least a portion of said video signals including said reference level to said desired value.

2. A contrast compressor according to claim 1 wherein said voltage clamping means is a feedback clamping means; said feedback clamping means being coupled to said output terminal of said amplifier for receiving output signals therefrom.

3. A contrast compressor according to claim 2 wherein said feedback clamping means clamp further comprises keyed clamping means adapted to sample said output signals during at least a portion of the time of said reference level.

4. A contrast compressor according to claim 3 wherein said keyed clamping means comprises a source of keying signals occurring during at least a portion of said time, storage means adapted for storing information representative of said output signal, and switch means coupled to said storage means and to said output terminal for coupling samples of said output signal to said storage means during said keying signals.

5. A contrast compressor according to claim 1, 2, 3 or 4 wherein said current-controllable resistance means comprises a diode.

6. A contrast compressor according to claim 1, 2, 3 or 4 wherein said current-controllable resistance means comprises a diode and a bias energy source coupled to said diode.

7. A contrast compressor according to claim 4 wherein said keyed clamping means further comprises resistance means coupled to receive said stored information and to convert said stored information to a current for application to said inverting input terminal.

* * * * *